2,849,479
S-NITROPHENYL CARBOXYALKYL DISULFIDES

Marvin Carmack, Bloomington, Ind., and John F. Harris, Jr., Wilmington, Del., assignors to the Trustees of the University of Pennsylvania, Philadelphia, Pa.

No Drawing. Application September 12, 1956
Serial No. 609,346

6 Claims. (Cl. 260—470)

This invention relates to a new class of organic disulfides and to their preparation.

More specifically, this invention comprises unsymmetrical nitrophenyl disulfides of formula (1)         R—S—S—R'—COOH and their salts and esters, where R is a nitro-substituted phenyl group and R' is an open-chain hydrocarbon or an acyl-substituted open-chain hydrocarbon radical; and their preparation by the methods outlined below.

This application is a continuation-in-part of copending United States application Serial No. 408,020, filed February 3, 1954, now abandoned.

The above-mentioned disulfides are conveniently prepared by reacting substantially equimolecular portions of a sulfenyl halide of formula (2)         RSX where R has the same significance as in formula 1 and X is halogen, preferably chlorine or bromine, with a mercaptoacid of formula (3)         HS—R'—COOH where R' has the same significance as in formula 1.

Some of the disulfides can also be prepared by reacting a dithiohalide of formula (4)         RS₂X where X is halogen, with a ketene, followed by hydrolysis.

Still another method which is applicable in some instances consists in reacting a dithiohalide with ethyl acetoacetate.

These reactions can be carried out at ordinary temperatures and pressures, but it is sometimes advantageous, particularly in the case of the last-named method, to use moderately elevated temperatures, for example, 50 to 100° C.

The unsymmetrical nitrophenyl disulfides (R—S—S—R'—COOH)

of this invention are crystalline solids which are generally yellow in color. For the most part, they can be melted without decomposition. They are insoluble in water but yield water-soluble salts with alkali bases, such as sodium and potassium hydroxide. They are somewhat soluble in organic solvents, such as ether and benzene, from which they are conveniently recrystallized. Reduction of the nitrophenyl disulfides of the invention using, for example, zinc and hydrochloric acid will give an aminothiophenol. The following equation is illustrative of such reduction.

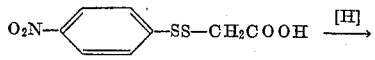

The following examples, in which parts are by weight, illustrate the preparation of representative disulfides of this invention.

Example 1

This example illustrates the preparation of o-nitrophenyl carboxymethyl disulfide,

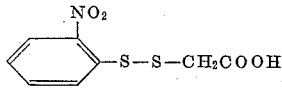

One part of freshly distilled thioglycolic acid in about 10 parts of anhydrous ether was added to 2.6 parts of o-nitrobenzenesulfenyl chloride in about 60 parts of anhydrous ether. After standing for one hour, the solution was evaporated to dryness, leaving 3.14 parts of yellow residue. After several recrystallizations from benzene, the product, o-nitrophenyl carboxymethyl disulfide, was obtained as yellow prisms melting at 119–120° C.

This compound was also prepared by reacting o-nitrophenyldithiochloride with ketene in anhydrous ether, followed by hydrolysis of the adduct with cold water.

Calcd. for C₈H₇O₄NS₂: C, 39.17; H, 2.88; S, 26.14. Found: C, 39.20; H, 2.95; S, 26.23.

Example 2

This example illustrates the preparation of 2,4-dinitrophenyl carboxymethyl disulfide,

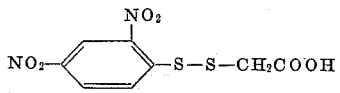

To 2 parts of 2,4-dinitrobenzenesulfenyl chloride in about 100 parts of anhydrous ether was added 0.4 part of thioglycolic acid dissolved in a few parts of ether. After the mixture stood a short while, the ether was removed by evaporation. The resulting solid was recrystallized from benzene, yielding 1.6 parts of 2,4-dinitrophenyl carboxymethyl disulfide as yellow plates melting at 138–139° C.

Example 3

This example illustrates the preparation of 2,4-dinitrophenyl 4-carboxybutyl disulfide,

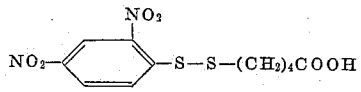

To 1.75 parts of 2,4-dinitrobenzenesulfenyl chloride in about 50 parts of anhydrous ether was added 1 part of delta-mercaptovaleric acid in 5 parts of ether. After cooling and filtering, there was obtained 1.98 parts of yellow solid melting at 122–124° C. After recrystallization from benzene, 2,4-dinitrophenyl 4-carboxybutyl disulfide was obtained as yellow prisms melting at 124–125° C.

Example 4

This example illustrates the preparation of ethyl alpha-o-nitrophenyldisulfidoacetoacetate, which has the formula

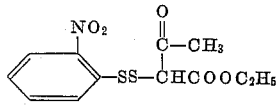

To a solution of 2.16 parts of o-nitrophenyldithiochloride in about 30 parts of anhydrous ethylene chloride was added 4 parts of freshly distilled ethyl acetoacetate. The mixture was refluxed for three hours. At the end of the reflux period, the solvent was evaporated, leaving an oil. This oil solidified on standing to 2.58 parts of yellow solid melting at 81–82° C. After several recrystallizations from hexane, the compound, ethyl alpha-o-nitrophenyldisulfidoacetoacetate, was obtained as yellow prisms mixed with needles melting at 82–83° C.

Calcd. for $C_{12}H_{13}O_5NS_2$: C, 45.70; H, 4.15; S, 20.33; terminal methyl, 9.54. Found: C, 45.80, 45.92; H, 4.34, 4.10; S, 20.98, 20.69; terminal methyl, 8.49.

The following are further examples of the novel compounds of our invention:

(1) 2,4-dinitro-5-carboxypentyl disulfide (M. P. 117° C.)
(2) 2-nitrophenyl-5-carboxypentyl disulfide (M. P. 82–82.5° C.)
(3) 2,4-dinitrophenyl-3-carboxypropyl disulfide
(4) 2-nitrophenyl-3-carboxypropyl disulfide
(5) 2-nitrophenyl methoxycarbonylmethyl disulfide
(6) 2,4-dinitrophenyl-2-methoxycarbonylethyl disulfide
(7) (4-nitrophenyldithio)acetic acid, sodium salt
(8) (2-nitrophenyldithio)propionic acid, potassium salt The disulfides of this invention can be used in the compounding of rubber and as dye intermediates. For example, the nitro group of the disulfides, after reduction to the amine using a mild reducing agent such as hydrazine hydrate, can be converted to the diazonium salt and the latter coupled with alpha-naphthol or similar aromatics to give useful azo dyes having both a carboxy group and a disulfide group. The preparation of such a dyestuff can be diagrammatically shown by reference to the following equation:

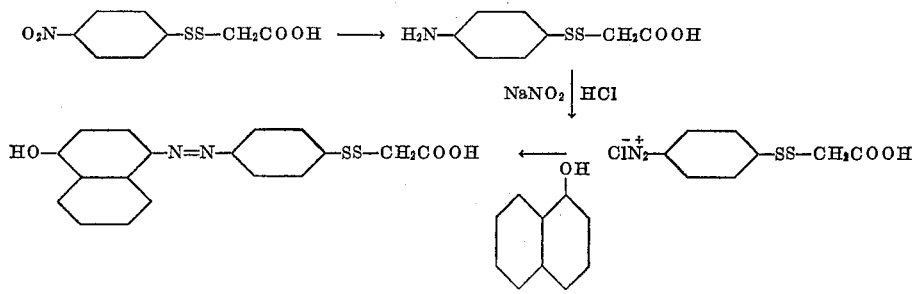

A dyestuff of the above type is of particular interest for use with proteins which also contain disulfide groups. Not only are azo dyes available in this fashion, but anil type dyes may be obtained by reduction of the nitro group and reaction with appropriate aldehydes.

The compounds of the present invention can also be used as inhibitors of the action of sulfuric acid upon ferrous metals. They also have been found to have utility as preventive fungicides against the early blight of tomato (*Alternaria solani*).

The fungicidal activity of the compounds of our invention has been demonstrated at low concentrations, say, of the order of 0.001 to 1% by weight. For example, when tomato foliage is sprayed with an 0.2% aqueous solution or suspension of 2-nitrophenyl carboxymethyl disulfide and (after the spray deposit dries), exposed to early blight fungus, it is found that the amount of infection is materially reduced as compared to untreated plants that are similarly exposed to early blight fungus.

The above description is intended to be illustrative only. Any modification of or variation therefrom which conforms to the spirit of the invention is intended to be included within the scope of the claims.

We claim:

1. An unsymmetrical nitrophenyl disulfide represented by the formula

R—S—S—R'—COOH and its salts and esters, where R is a nitro-substituted phenyl group having from 1 to 2 nitro substituents and R' is a radical having from 1 to 5 carbon atoms and selected from the class consisting of an open-chain hydrocarbon and an acyl-substituted open chain hydrocarbon radical.

2. A compound of claim 1 where R is a dinitro-substituted phenyl group.
3. o-Nitrophenyl carboxymethyl disulfide.
4. 2,4-dinitrophenyl carboxymethyl disulfide.
5. 2,4-dinitrophenyl 4-carboxybutyl disulfide.
6. Ethyl alpha-o-nitrophenyldisulfidoacetoacetate.

References Cited in the file of this patent

UNITED STATES PATENTS

| | | |
|---|---|---|
| 1,994,641 | Haddock et al. | Mar. 19, 1935 |
| 2,041,716 | Kershaw | May 26, 1936 |

OTHER REFERENCES

Jocini et al.: Chem. Abst. 46, 4499 (1952).